United States Patent [19]

Sarné et al.

[11] Patent Number: 5,762,091

[45] Date of Patent: Jun. 9, 1998

[54] THERMAL-PRESSURE RELIEF DEVICE

[76] Inventors: Daniel L. Sarné, 7845 Berner St., Long Beach, Calif. 90808; Harry W. Buehrle, II, 14 Alegria, Irvine, Calif. 92620

[21] Appl. No.: 690,750

[22] Filed: Aug. 1, 1996

[51] Int. Cl.⁶ ............................................. F16K 17/40
[52] U.S. Cl. ........................................ 137/74; 137/79
[58] Field of Search ............................ 137/72, 73, 74, 137/79

[56] References Cited

U.S. PATENT DOCUMENTS

| | | | |
|---|---|---|---|
| 900,763 | 10/1908 | McNutt | 137/74 X |
| 4,365,643 | 12/1982 | Masclet et al. | 137/72 X |
| 4,744,382 | 5/1988 | Visnic et al. | 137/73 X |
| 4,899,777 | 2/1990 | Stone et al. | 137/72 X |
| 4,989,627 | 2/1991 | McAfee | 137/72 |
| 5,435,333 | 7/1995 | Duvall | 137/74 X |

*Primary Examiner*—John Fox
*Attorney, Agent, or Firm*—Gordon K. Auderson

[57] ABSTRACT

A thermal-pressure relief device, which has an adapter (20) threaded into the wall of a pressure vessel. The adapter contains an orifice (22) therethrough with a blowout disc (30) overlapping the orifice to obstruct communication with fluid inside the vessel. The disc is attached by brazing with a filler metal in the form of a temperature responsive amalgam (38), preferably a eutectic alloy. When ambient temperatures are elevated above the melting point of the amalgam, the disc is blown out, freeing the orifice, relieving the pressure within the vessel, preventing an explosion. A protective cover in the form of a cap (42) with an impact surface (40) contains the disc when it separates from the adapter and a number of vents (48) diffuse the fluid from the pressure vessel in a safe direction.

10 Claims, 2 Drawing Sheets

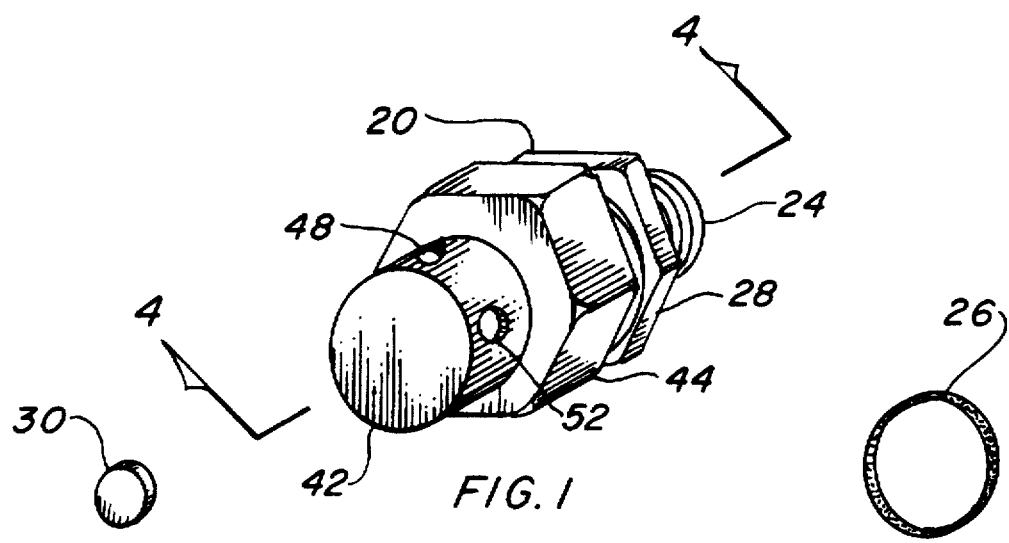
FIG. 1    FIG. 2    FIG. 3
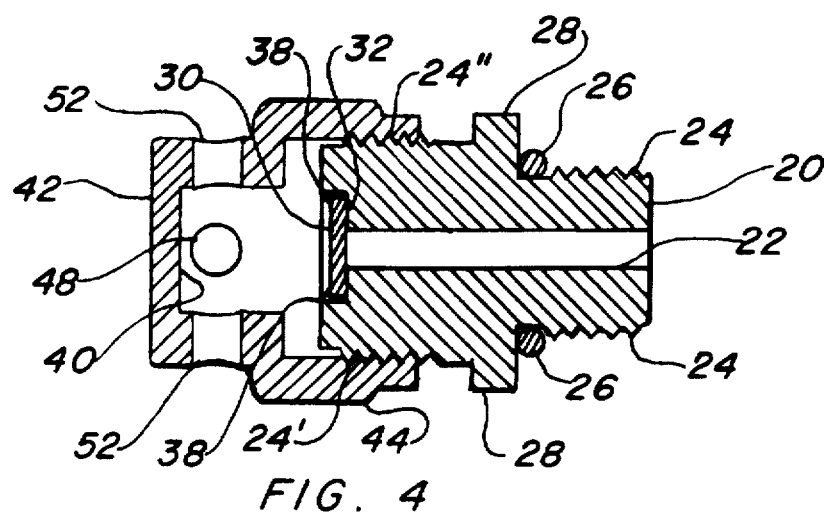
FIG. 4
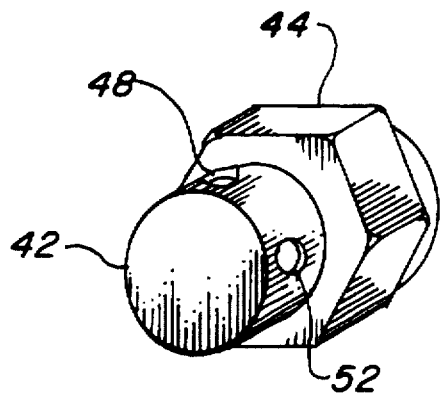    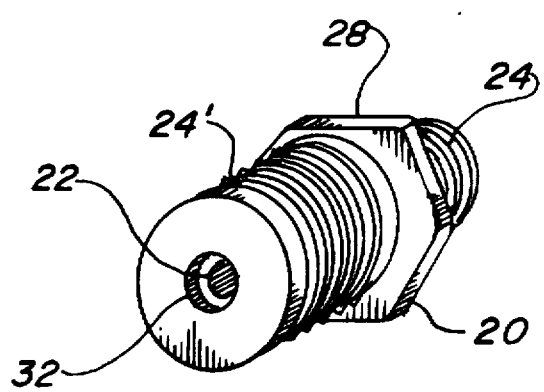
FIG. 5    FIG. 6

THERMAL-PRESSURE RELIEF DEVICE

TECHNICAL FIELD

The present invention relates to pressure relief devices actuated by temperature in general. More specifically, to a device that will relieve pressure within a pressure vessel before high temperature has raised the pressure of a fluid within the vessel to a dangerous explosive condition.

BACKGROUND ART

Previously, many types of pressure relief devices have been used in endeavoring to provide an effective means for releasing pressure within a vessel. Any pressure vessel that is made to contain a compressed fluid, be it liquid or vapor, has the dangerous potential to explode when the internal pressure increases above the burst strength of the vessel material.

To protect the public from a dangerous situation that could actually kill or maim humans, government agencies have placed stringent requirements on all pressure vessels to include safety devices that relieve the pressure prior to reaching a critical point. Government agencies, as well as independent professional societies, trade associations, and manufacturers groups, issue codes to establish procedures and standards that are accepted by the government and the industry at large.

With regard to pressure vessels, current methods incorporate pressure relief safety devices. Prior art may be in the form of relief valves that are usually spring loaded, membrane discs that open at a predetermined pressure range, or fusible plugs that are designed to melt at a given temperature for low pressure (500 psi/3.448 Kpa) relief. These devices may be used separately, or in concert. The relief port is sized to displace a given volume of fluid for a particular capacity vessel. The dimension of the relief port is also controlled and precisely specified by government agencies, such as Department of Transportation (DOT), as well as other civilian standards.

DISCLOSURE OF THE INVENTION

Technology has advanced the field of pressure vessel fabrication from the traditional metallic construction, using a tube constructed by welding domed heads on each end, to lightweight vessels using composite materials. Minimal weight vessels are commonly constructed, using a metal liner of ferrous or aluminum material, wound on the outside with a fibrous filament impregnated or coated with a thermosetting resin and bonded together with heat and pressure. For example, KEVLAR filament wound composite pressure vessels are used in aircraft where weight is of prime importance and pressures are elevated.

Similar lightweight vessels could replace heavy steel vessels used in alternate fuel vehicles, once the issue of thermal pressure relief has been resolved in the best interest of public safety.

In applications above 500 psi (3,448 Kpa), the need arises to provide a thermally actuated pressure relief, since conventional fusible plugs are not certified above 500 psi (3,448 Kpa).

Mechanical spring loaded membrane pressure relief valves may still be employed with higher pressure composite bottles, however their use does not fulfill the entire safety requirement of a pressure vessel subjected to external heat, such as a fire. Vessel safety assurance is not achieved with only a pressure relief valve, because the outside wound laminate acts as an insulator. This prevents the interior fluid from elevating in temperature and pressure sufficient to actuate the pressure relief valve before the vessel may be burned through, resulting in a catastrophic explosion.

It is, therefore, a primary object of the invention to fulfill this recently created need for providing a thermal-pressure relief device that has high pressure capabilities for use with lightweight composite vessels, as well as other elevated pressure applications. It may be noted that at the present time, utilization of composite vessels is unlimited. The Department of Transportation (DOT) has not, as yet, approved devices of this style for over the road and airborne applications. One embodiment of the instant invention is in the process of being tested and qualified for a maximum working pressure of 3,500 psi (24,133 Kpa). Higher pressure applications are readily achievable, which will satisfy the industry safety requirement.

Another object of the invention is that the material used to melt at relatively low temperature was prone to "Creep" failure of the eutectic after long term exposure to high pressure.

This pressure limitation is due to a structural failure mode identified as Creep. A definition of "Creep" is, "a de-stressing movement causing a slow change of dimensional proportions". The common alloys utilized for thermal pressure relief are selected specifically for their low melting temperatures. These materials are comprised primarily of bismuth alloy, with other metals, including lead, tin, cadmium and indium, none of which are known for their structural integrity under long term stress and loads. That is, all will fail due to creep, given sufficient time and pressure.

While below 500 psi (3.448 Kpa) the problem is minimal, but at higher pressures and long term exposure, the thermal melt material degrades, therefore creep failure develops. To insure continued safety, existing relief devices are required to be replaced periodically. The need for continual replacement of existing pressure relief devices adversely affects "Life Cycle" cost and entails additional record keeping to insure proper "Change Outs" have occurred.

The present invention overcomes this problem by increasing the bonding area relative to the relief orifice and utilizing a secondary blowout disc to cover the orifice. The fluid within the pressure vessel has no direct contact with the low melting alloy. This unique embodiment permits the use of time tested commercially available low melting alloys while eliminating the "Creep" failure mode.

Still another object of the invention is directed to existing problems created by incompatible materials. Existing designs allow the low melting alloys or amalgam to be in surface contact with the fluid within the vessel. Chemical and electro-mechanical reaction may occur. The novel approach of using a separate blow-out disc of the same metal as the vessel liner, or a compatible metal with the compressed fluid, minimizes compatibility problems and retains the use of well known and reliable low melting alloys.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is an isometric view of the preferred embodiment.

FIG. 2 is an isometric view of the blowout disc completely removed from the invention for clarity.

3

FIG. 3 is an isometric view of the compression seal in the form of an "O" ring completely removed from the invention for clarity.

FIG. 4 is a cross-sectional view taken along lines 4—4 of FIG. 1.

FIG. 5 is an isometric view of the protective cover completely removed from the invention for clarity.

FIG. 6 is an isometric view of the adapter completely removed from the invention for clarity.

Figure 7:
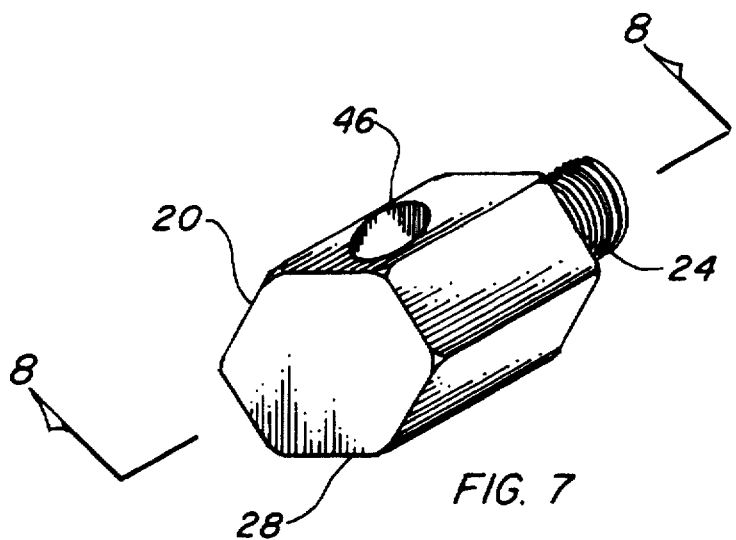

FIG. 7 is an isometric view of the thermal pressure relief device with the protective cover integral with the adapter.

Figure 8:
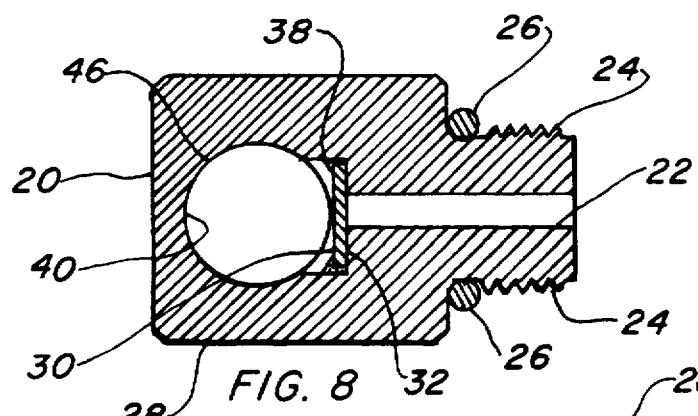

FIG. 8 is a cross-sectional view taken along lines 8—8 of FIG. 7, except rotated 90 degrees for clarity.

Figures 9, 10, 11:
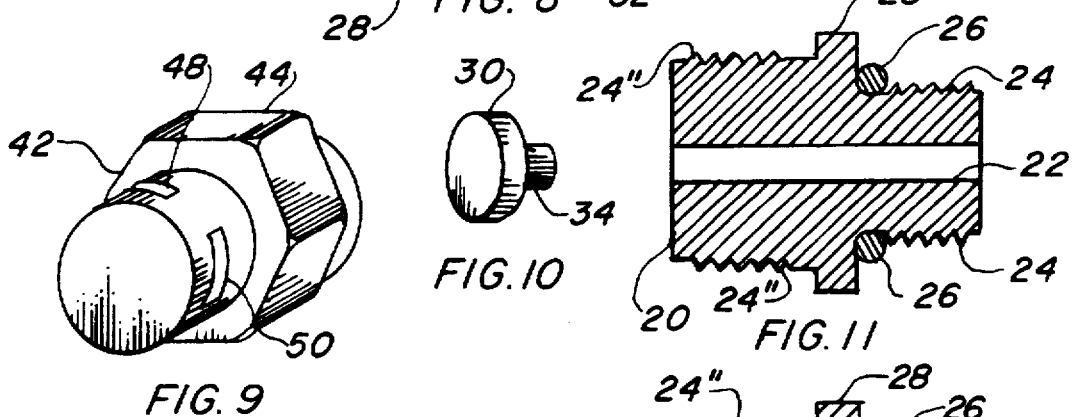

FIG. 9 is an isometric view of the protective cap with slots as vents for defusing fluid from the device.

FIG. 10 is an isometric view of the blowout disc in the stepped plug embodiment, completely removed from the invention for clarity.

FIG. 11 is a cross-sectional view of the adapter in the stepped plug embodiment, taken along the centerline.

Figures 12, 13:
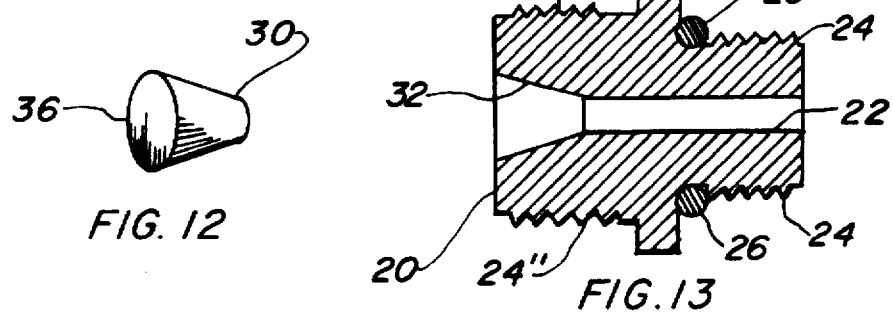

FIG. 12 is an isometric view of the blowout disc in the tapered plug embodiment, completely removed from the invention for clarity.

FIG. 13 is a cross-sectional view of the adapter in the tapered plug embodiment, taken along the centerline.

FIG. 14 is a centerline cross sectional view of the preferred embodiment having an indented tray-pan added in the recessed cavity.

FIG. 15 is an enlarged view of FIG. 14 illustrating only the tray-pan and disc relationship.

FIG. 16 is an enlarged view of FIG. 14 illustrating one side of the tray-pan disc and recessed cavity only.

BEST MODE FOR CARRYING OUT THE INVENTION

The best mode for carrying out the invention is presented in terms of a preferred embodiment. The preferred embodiment, as shown in FIGS. 1 through 13, is comprised of an adapter 20 that contains an orifice 22, in the form of a hole or bore, that penetrates the entire longitudinal axis. This orifice 22 is preferably positioned on the centerline, however any location is acceptable, provided it continues through to communicate with the fluid within the pressure vessel. The adapter 20 has a first end and a second end with the first end configured in such a manner as to be connected through a pressure vessel wall in intimate contact with the working fluid stored inside and the orifice 22 provides a conduit for allowing fluid to escape, in the event of excessive pressure within caused by external heat. The second end of the adapter 20 includes a circular recessed cavity 32 larger in diameter and integral with the orifice 22. The diameter and tolerance of the orifice is selected by code requirements, such as dictated by the United States Government Department of Transportation, specifically DOT 3AX, 3AAX and 3T. Code of Federal Regulations CFR 173.34(d). As well as industry standards including the Compressed Gas Association Inc. CGA PRD-1 Standard 1998. These codes include requiring a definite flowrate for the fluid volume within a given pressure vessel that the relief device protects. The orifice size is selected by calculations using the volume of the vessel and the particular fluid with its flowrate of exit gas (or liquid) rated in cubic feet per minute (CFM). FIG. 4 illustrates this adapter 20 in cross-section and FIG. 6 depicts it removed from the invention for clarity.

4

Connections to the pressure vessel may be made by various methods known in the art. FIG. 4 depicts the well known high pressure seal that uses a set of straight threads 24 for mechanical engagement and a resilient seal, in the form of an "O" ring 26, for a liquid/vapor-tight closure. While this connecting and sealing approach is illustrated and described as the preferred embodiment, any type of connection and sealing means may be used with equal ease and dispatch. These approaches include tapered threads, so-called dry-seal threads, metallic crush washers with external compression, double flaring, separate compression sleeves, olives, and many other connections known to those skilled in the art.

In order to screw in the adapter 20 mechanically, wrench gripping means are provided. The preferred method is illustrated in FIGS. 1, 4, 6 through 8, 11, and 12, which is to incorporate a hexagonal flange 28 integral with the body of the adapter 20. While a hexagonal shape is shown, and in common use, any form is also acceptable, such as square, rectangular, round with opposed flats, etc. Wrench gripping means may also include screwdriver slots, holes for wrenching bars, or any other method of rotating a device to produce a suitable connection.

A non-permeable blowout disc 30 engages the recessed cavity 32 of the adapter adapter 20 overlaying or covering the orifice 22, obstructing the flow of fluid from within the vessel. This disc 30, in its preferred embodiment, is illustrated in FIGS. 2 and 4 and consists of a flat, round plate made of metal. Stainless steel or brass material is preferred, however other metals, or even non-metals, may be used for compatibility with the vessel liner and/or fluid stored within the vessel. An important point of novelty of the invention is that the disc may be easily formed of a compatible material that is in exclusive communication with the internal fluid of the vessel, which differs greatly from prior art in the same field of endeavor.

The preferred embodiment of this disc 30 is configured to be positioned within the recessed cavity 32 in the adapter 20, bored axially with the orifice 22, having an extended surface therein as shown in FIG. 4. This cavity 32 provides a convenient seat for centering the disc 30 in the middle of the orifice 22 and permits an ideal socket for attachment. The recessed cavity 32 selected is a counterbore in the preferred embodiment, which also serves to increase the area of contact between the disc 30 and the adapter 20. It has been found that a surface area in excess of 150 percent larger in diameter than the diameter of the orifice 22 is ideal for the contact area.

Other embodiments of the disc 30 are illustrated in FIGS. 10 through 13. FIGS. 10 and 11 depict an embodiment wherein the disc 30, instead of being flat, consists of a stepped plug 34 that penetrates the orifice 22 utilizing a slip fit. This configuration accomplishes the desired effect in that only the plug 34 is in contact with the fluid inside the vessel, and the stepped portion permits the ideal increased surface area for attachment to the adapter 20. FIGS. 12 and 13 show, yet, another embodiment wherein the disc 30 is in the shape of a tapered plug 36, again having the desired characteristics of contact and attachment surface area.

A temperature responsive amalgam 38 is set between the adapter 20 and the disc 30 and acts as the attachment means connect the two together and effectively obstruct the orifice 22 in a leakproof manner. This amalgam 38 is selected for its predictable and relatively low temperature melting characteristics. A eutectic alloy, sometimes called low melt alloy i.e. preferred material. Other materials having broader temperature melt ranges (non-eutectic) may also be used as the amalgam. The chief component in this alloy is bismuth, a heavy, coarse, crystalline metal combined with other metals, such as lead, tin, cadmium, and indium. The melting temperature of this alloy may vary from 100 degrees F. (38 degrees C.) to 600 degrees F. (315 degrees C.), according to the formulation. Selection of the specific melting temperature is dependant upon this unique requirement of the application and upon the fluid being housed within the vessel and the vessel design characteristics. A specific manufacturer of this product is The Cerro Metal Products Division of The Cerro Corporation of Pennsylvania, marketed under the registered trademark. CERRO ALLOYS.

The specific amalgam 38 is applied to the invention as a welding process in the form of brazing, rather than simply filling the orifice 22 with the base material, as employed in the fusible plugs of prior art. Major difficulties arise, as previously discussed, by exposing the amalgam 38 to the fluid within the vessel. The disc 30, therefore, is simply brazed onto the adapter 20 using the amalgam 38, in the form of a eutectic alloy, as the filler metal. The close fitting joint between the disc 30 and adapter 20 is filled by capillary attraction of the liquidous alloy when the assembly is furnace heated to a temperature above the melting point of the alloy, but below that of the metals being joined. This coalescence produces a solid brazed joint that eliminates the problems pertaining to exposure of the amalgam 38 to the stored fluid, while still allowing the physical properties of the eutectic alloy to melt at the appropriate temperature and produce the desired thermal-pressure relief. While the preferred embodiment, depicted in FIG. 1, utilizes a recessed cavity 32 in the form of a countersunk hole, the other embodiments illustrated use stepped or tapered plugs penetrating directly into the orifice 22. In all of the embodiments, brazing is accomplished in the same manner. In order to preserve the integrity of the joint, while disallowing contact of the amalgam 38 to the fluid, external pressure may be applied to the disc 30, or plugs 34 and 36, compressing them together during the brazing process precluding any flash-over or seepage onto exposed surfaces.

While the preferred amalgam 38 is a eutectic alloy, other substances function equally well. Silver alloy (non-eutectic), having a melting point from 350 degrees F. (176 degrees C.) to 1200 degrees F. (648.9 degrees C.), thermoset plastics, thermoplastics, or anaerobic adhesives, in all their varieties and formulations may be utilized, dependant, of course, upon the desired melting point.

In normal conditions, the entire device is subjected to the usual prevailing ambient temperatures, however, if adverse conditions arise, such as when the pressure vessel is exposed to a fire, the external ambient temperature will rise above the melting point of the amalgam 38, thereby freeing the disc 30. Pressure within the vessel will then blowout the disc or plug, clearing the orifice passageway, safely relieving the fluid pressure within before an explosion can occur. It has been found by computer modeling and by physical tests that the space between the recessed cavity 32 and the edge of the disc 30 is meaningfully significant in order for the amalgam 38 to produce optimum cohesion and minimize time dependent inelastic stress relaxation, therefore the recessed cavity diameter must be a minimum of 15 percent larger than the diameter of the disc.

Protective cover means structurally engage the adapter 20 and include a continuous structurally sound impact surface 40 in spaced alignment with the blowout disc 30. The disc 30 impinges on this impact surface 40 when it is blown out and separates from the adapter. The preferred embodiment of the protective cover means is a threaded cap 42, illustrated in FIGS. 1, 4, 5, and 9. This cap 42 is preferably made of metal, such as brass, steel, iron, stainless steel, aluminum, etc., and contains a set of threads 24' that mate with opposed threads 24" in the adapter 20. The outside surface of the cap 42 includes an integral flange with flats 44 for wrench engagement. A hexagonal shape of this flange 44 is preferred, however, any number of flats, or any other type of wrenched surface, is acceptable.

FIGS. 7 and 8 illustrate another embodiment of the cap 42, which is integral with the adapter 20. In order to have access to the orifice 22, a hollow passage 46 is drilled completely through, permitting insertion of the disc 30 and brazing with the amalgam 38. While counterboring is illustrated for the recessed cavity 32 corresponding to the flat disc 30, in FIG. 8, this cap embodiment may also utilize the stepped plug 34 or tapered plug 36 with equal ease.

In the preferred threaded cap 42 embodiment, vents 48 are added on opposite sides at right angles to the impact surface 40. This location permits fluid to be diffused axially from the relief device, and also captivate the disc 30 in a safe manner. As an alternative shape, the vents 48 may be configured as slots 50, shown in FIG. 9, instead of holes 52, illustrated in FIGS. 1, 4, and 5. In order to save weight, the cap 42 may be stepped to a reduced diameter near the outer terminus, if desired.

While the threads 24' and 24" are shown as female and male relative to the cap 42 and adapter 20, their function may be reversed. Further, other means may be used to fasten the cap 42 to the adapter 20, such as structural adhesive, welding, pinning, riveting, utilization of threaded fasteners, etc.

It may be clearly seen that another embodiment of the preferred embodiment and its slight variations fill the need for a safety device that will protect pressure vessels using state of the art construction techniques and open up an entire new industry for supplying commercial applications, particularly associated with over-the-road or air transportation.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A thermal-pressure relief device for pressure vessels that contains a compressible fluid comprising:

an adapter having a first end and a second end with an orifice therethrough, the first end disposed within a pressure vessel wall in intimate contact with working fluid stored therein, the second end having a circular recessed cavity larger in diameter and integral with the orifice, a non-permeable blowout disc, smaller in diameter than the circular recessed cavity and engaging the cavity, overlaying said orifice so as to create an obstruction, ultimately preventing fluid flow through the orifice, a temperature responsive amalgam juxtapositioned exclusively between the adapter and the disc, joining them together in a cohesive manner, providing a leakproof closure, disjoining at a predetermined external ambient temperature, relieving fluid pressure within the vessel as a safety measure to prevent an explosion due excessive pressure within, and protective cover means structurally engaging the adapter, having a continuous structurally sound impact surface in spaced alignment with the blowout disc for containing the disc when separated from the adapter, said cover means also having a plurality of vents for diffusing fluid from the pressure vessel in a safe manner.

2. The thermal-pressure relief device as recited in claim 1 wherein said protective cover means is integral with the adapter.

3. The thermal-pressure relief device as recited in claim 1 wherein said protective cover means vents are opposed at right angles to the impact surface diffusing fluid axially from the relief device.

4. The thermal-pressure relief device as recited in claim 1 wherein the recessed cavity is in excess of 150 percent larger in diameter than the orifice diameter.

5. The thermal-pressure relief device as recited in claim 4 wherein said circular recessed cavity diameter relative to the orifice diameter overcomes time dependent inelastic stress relaxation of the amalgam at pressures above 500 pounds per square inch (3447.5 Kpag) and above 100 degrees F. (37.8 degrees C.) for a duration of at least 500 hours.

6. The thermal-pressure relief device as recited in claim 1 wherein said circular recessed cavity is at least 15 percent larger in diameter than the disc.

7. A thermal-pressure relief device for pressure vessels that contains a compressible fluid comprising:

an adapter having a first end and a second end with an orifice therethrough, the first end disposed within a pressure vessel wall in intimate contact with working fluid stored therein, the second end having a circular recessed cavity larger in diameter and integral with the orifice, a non-permeable blowout disc contiguously engaging the recessed cavity of the adapter, overlaying said orifice so as to create an obstruction, ultimately preventing fluid flow through the orifice, said recessed cavity having a minimum of 15 percent larger diameter than the diameter of the disc, a temperature responsive amalgam juxtapositioned exclusively between the adapter and the disc, joining them together in a cohesive manner, providing a leakproof closure, disjoining at a predetermined external ambient temperature, relieving fluid pressure within the vessel as a safety measure to prevent an explosion due excessive pressure within, and protective cover means structurally engaging the adapter, having a continuous structurally sound impact surface in spaced alignment with the blowout disc for containing the disc when separated from the adapter, said cover means also having a plurality of vents for diffusing fluid from the pressure vessel in a safe manner.

8. A thermal-pressure relief device for pressure vessels that contains a compressible fluid comprising:

an adapter having an orifice therethrough with a larger recessed cavity on one end, a non-permeable blowout disc contiguously engaging the recessed cavity of the adapter preventing fluid flow through the orifice, said disc smaller in diameter than the cavity, a temperature responsive amalgam juxtapositioned between the adapter and the disc, joining them together while disjoining at a predetermined temperature, relieving fluid pressure within the vessel to prevent an explosion due excessive pressure within, and protective cover means structurally engaging the adapter, having a solid impact surface in spaced alignment with the blowout disc for containing the disc when separated from the adapter.

9. The thermal-pressure relief device as recited in claim 8 wherein said adapter recessed cavity is a counterbore, and said blowout disc is a stepped plug.

10. The thermal-pressure relief device as recited in claim 8 wherein said adapter recessed cavity is tapered inwardly, and said blowout disc is a tapered plug.

* * * * *